(12) United States Patent
Uehara et al.

(10) Patent No.: US 8,363,336 B2
(45) Date of Patent: Jan. 29, 2013

(54) LENS BARREL

(75) Inventors: Takumi Uehara, Kawasaki (JP);
Shuichi Terada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 13/114,409

(22) Filed: May 24, 2011

(65) Prior Publication Data

US 2011/0292523 A1 Dec. 1, 2011

(30) Foreign Application Priority Data

May 31, 2010 (JP) .................................. 2010-124471

(51) Int. Cl.
*G02B 17/00* (2006.01)

(52) U.S. Cl. ...................................................... 359/726
(58) Field of Classification Search .................. 359/726, 359/871, 872, 874, 877
See application file for complete search history.

(56) References Cited

U.S. PATENT DOCUMENTS 7,369,326 B2 * 5/2008 Yagyu et al. ................... 359/689

FOREIGN PATENT DOCUMENTS

JP 2007-226106 9/2007

* cited by examiner

*Primary Examiner* — Joseph P Martinez
(74) *Attorney, Agent, or Firm* — Cowan, Liebowitz & Latman, P.C.

(57) ABSTRACT

A lens barrel that is capable of miniaturizing an image pickup apparatus by decreasing an area that is occupied by transmission mechanisms. A lens group is movable along a first optical axis. A cam barrel moves the lens group. A first transmission mechanism transmits a driving force of a driving source to the cam barrel. A bending optical element is movable along a second optical axis that intersects the first optical axis. An element driver moves the bending optical element between a taking position and an escape position along the second optical axis. A second transmission mechanism transmits a driving force of a driving source to the element driver. The second transmission mechanism is arranged within an arrangement area of the first transmission mechanism when viewing in the direction of the first optical axis.

3 Claims, 7 Drawing Sheets

LENS BARREL

BACKGROUND OF THE INVENTION

1. Field of the Invention

The present invention relates to a lens barrel that has a bending optical element such as a prism or a mirror.

2. Description of the Related Art

This kind of conventional lens barrel is provided with a lens frame that can move within a range between a retracted position and a taking position in an optical axis direction while holding a lens, and a prism that bends an incident light flux passing through the lens in a direction crossing the optical axis to guide the light flux to an image pickup device. The prism is located at the back side of the lens frame in the optical axis direction to bend the incident light flux to the image pickup device when the lens frame is in the taking position. The prism moves to an escape position from the back side of the lens frame in order to keep storage space of the lens frame when the lens frame is in the retracted position (see Japanese Laid-Open Patent Publication (Kokai) No. 2007-226106 (JP 2007-226106A)).

Incidentally, when the lens is moved in the optical axis direction together with the lens frame, a driving force of a motor is transmitted to a cam barrel that is engaged to the lens frame via a first transmission mechanism. When the prism is moved within a range between the back side position of the lens frame and the escape position, the driving force of the motor is transmitted to the prism via a second transmission mechanism.

However, JP 2007-226106A discloses the configuration in which the first transmission mechanism that transmits the driving force of the motor to the cam barrel and the second transmission mechanism that transmits the driving force of the motor to the prism are mutually separated in a direction (a diameter direction of the cam barrel) that intersects an axis of the cam barrel when viewing in the axial direction of the cam barrel. Therefore, the area, which is occupied by the first and second transmission mechanisms when viewing in the axial direction of the cam barrel, becomes large, which prevents an image pickup apparatus from miniaturizing.

SUMMARY OF THE INVENTION

The present invention provides a mechanism that is capable of miniaturizing an image pickup apparatus by decreasing an area that is occupied by a first transmission mechanism that transmits a driving force of a drive source to a cam barrel and a second transmission mechanism that transmits the driving force of the drive source to a bending optical element when viewing in an axial direction of the cam barrel.

Accordingly, an aspect of the present invention provides a lens barrel comprising a lens group that is movable along a first optical axis, a cam barrel that moves the lens group, a first transmission mechanism that transmits a driving force of a driving source to the cam barrel, a bending optical element that is movable along a second optical axis that intersects the first optical axis, an element driver that moves the bending optical element to a position where the bending optical element bends a light flux entered through the lens group in the direction of the second optical axis when the lens group and the cam barrel move in an extending direction along the first optical axis, and that moves the bending optical element to an escape position along the second optical axis to form a storage space for the cam barrel when the lens group and the cam barrel move in a retracting direction along the first optical axis, and a second transmission mechanism that transmits a driving force of a driving source to the element driver, wherein the second transmission mechanism is arranged within an arrangement area of the first transmission mechanism when viewing in the direction of the first optical axis.

According to the present invention, since the area that is occupied by the first transmission mechanism that transmits the driving force of the drive source to the cam barrel and the second transmission mechanism that transmits the driving force of the drive source to the bending optical element when viewing in an axial direction of the cam barrel can be decreased, the image pickup apparatus can be miniaturized.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
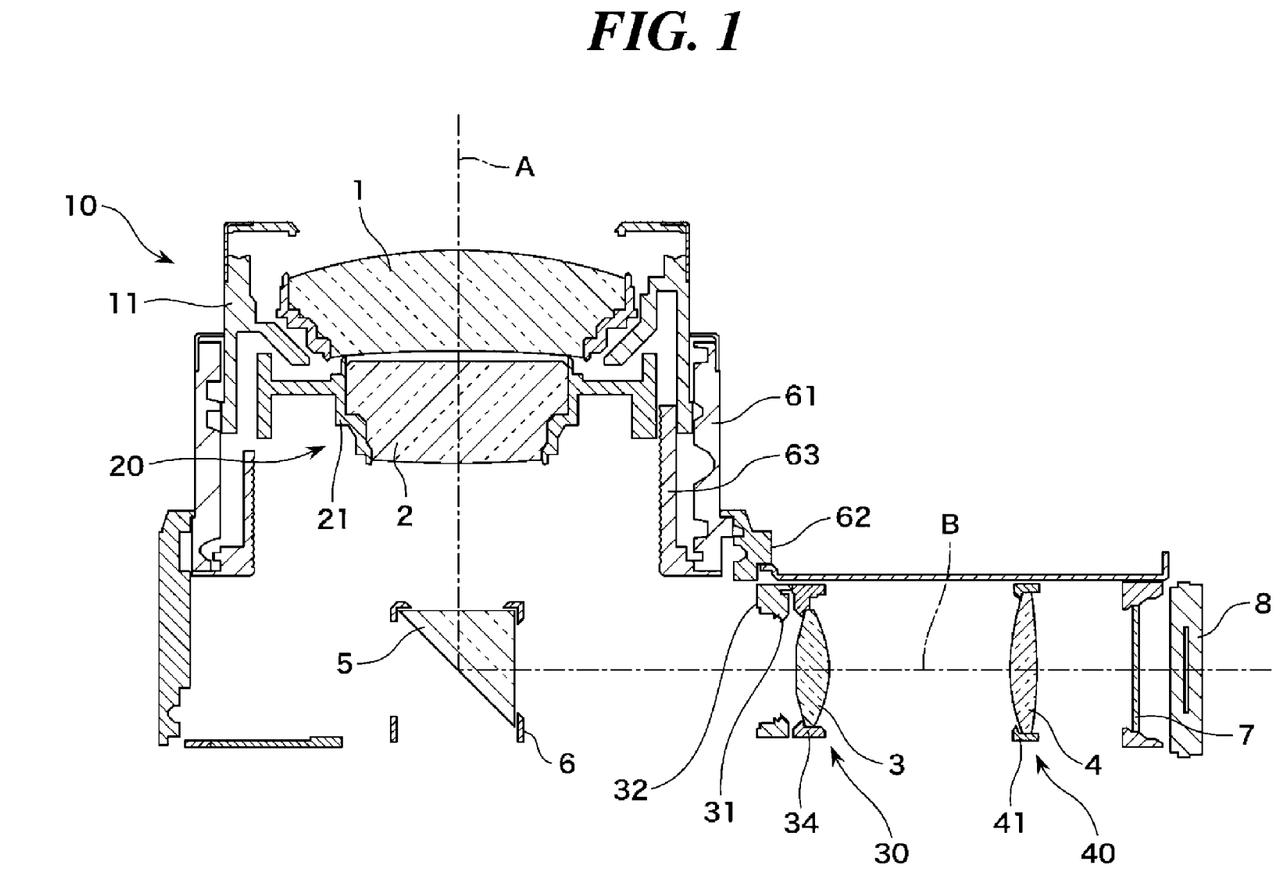
FIG. 1 is a sectional view showing a main part of a lens barrel according to an embodiment of the present invention under a condition where the lens barrel is in a WIDE position (a wide-angle position).

FIG. 1 is sectional view showing, a main part of a lens barrel according to an embodiment of the present invention under a condition where the lens barrel is in a WIDE position (a wide-angle position). It should be noted that the lens barrel of this embodiment is mounted on an image pickup apparatus such as a digital camera.

As shown in FIG. 1, the lens barrel of this embodiment is provided with a first lens unit 10, a second lens unit 20, a prism 5, a fixed barrel 62, a cam barrel 61, and a rectilinear guide barrel 63.

The first lens unit 10 is constituted by holding a first lens group 1 by a first barrel 11, and the second lens unit 20 is constituted by holding a second lens group 2 by a second barrel 21. The light flux entered through the first and second lens groups 1 and 2 is bended by the prism 5 in a direction of an optical axis B that intersects an optical axis A of the first and second lens groups 1 and 2 at about 90 degrees, and is guided to an image pickup device 8.

The prism 5 is an example of a bending optical element of the present invention, and is held by a holding member 6 so as to be movable along the optical axis B. A third lens unit 30, a fourth lens unit 40, and an optical filter 7 are arranged between the prism 5 and the image pickup device 8 along the optical axis B. Here, the optical axis A is an example of a first optical axis of the present invention, and the optical axis B is an example of a second optical axis of the present invention.

The third lens unit 30 is provided with a shutter 31 fixed to a front base plate 32, and a third lens group 3 held by a rear base plate 34. The rear base plate 34 and the front base plate 32 are mutually connected by a screw etc. Movement along the optical axis B of the third lens unit 30 achieves a zooming operation. The fourth lens unit 40 is constituted by holding a fourth lens group 4 by a lens holder 41, and movement of the fourth lens unit 40 along the optical axis B achieves the zooming operation and a focusing operation. The optical filter 7 has a low pass filter function for cutting light with high spatial frequency, and a function for cutting infrared light.

Figure 2:
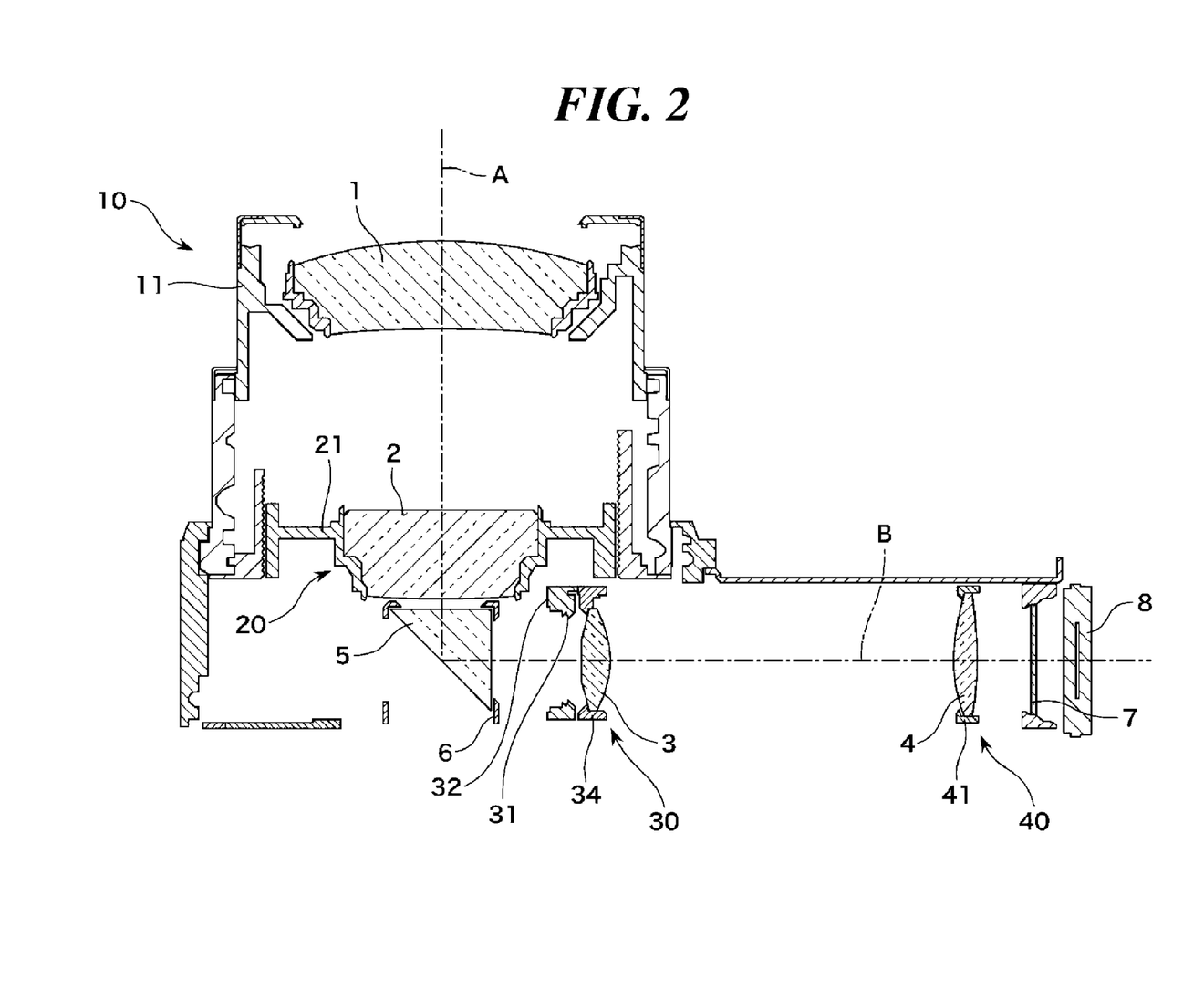
FIG. 2 is a sectional view showing the main part of the lens barrel shown in FIG. 1 under a condition where the lens barrel is in a TELE position (a telephoto position).

FIG. 2 is a sectional view showing the main part of the lens barrel shown in FIG. 1 under a condition where the lens barrel is in a TELE position (a telephoto position). As shown in FIG. 2, when the lens barrel is in the TELE position, the first lens unit 10 moves forward to a subject side along the optical axis A. The second lens unit 20 moves backward along the optical axis A, and stops at a position close to the prism 5. The third lens unit 30 moves toward the prism along the optical axis B, and stops at a position close to the prism 5. The fourth lens unit 40 moves toward the image pickup device 8 along the optical axis B, and stops at a position close to the image pickup device 8.

Figure 3:
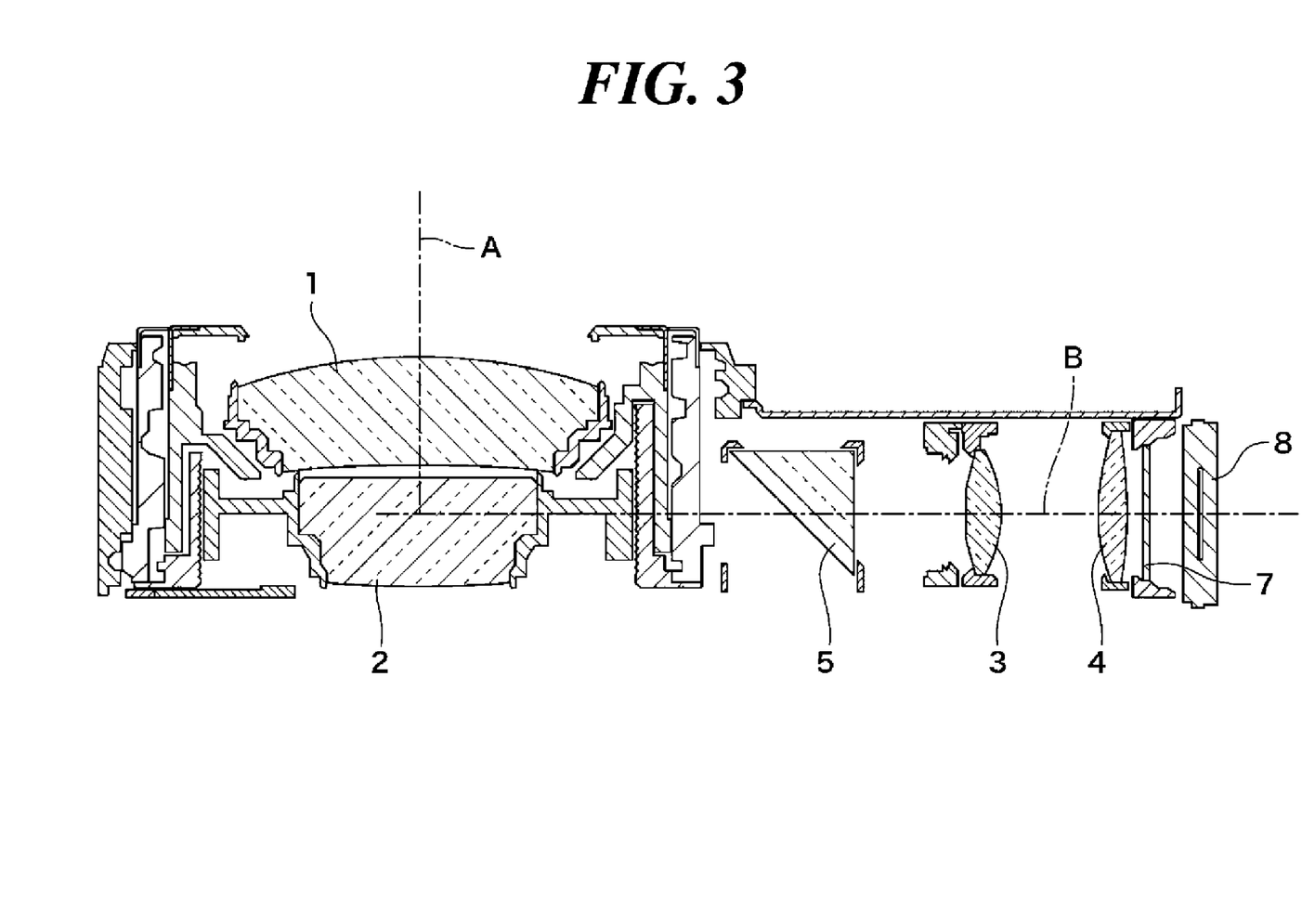
FIG. 3 is a sectional view showing the main part of the lens barrel shown in FIG. 1 under a condition where the lens barrel is in a SINK position (a retracted position).

FIG. 3 is a sectional view showing the main part of the lens barrel shown in FIG. 1 under a condition where the lens barrel is in a SINK position (a retracted position). As shown in FIG. 3, when the lens barrel is in the SINK position, the prism 5, the third lens unit 30, and the fourth lens unit 40 move toward the image pickup device 8 along the optical axis B so that they do not interfere mutually. Accordingly, storage space is formed behind the first and second lens units 10 and 20, and the first and second lens units 10 and 20 move backward along the optical axis A, and are stored in the storage space.

Figure 6:
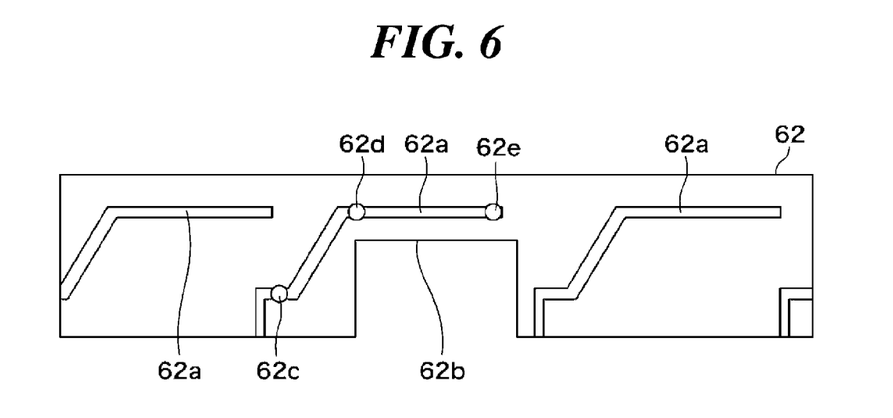
FIG. 6 is a development view showing an inner surface of a fixed barrel in the lens barrel shown in FIG. 1.

Cam grooves 62a to which cam pins (not shown) mounted on an outer periphery of the cam barrel 61 are engaged are formed on an inner periphery of the fixed barrel 62 at nearly regular intervals in a circumferential direction (see FIG. 6). A gear section 61a is formed on the outer periphery of the cam barrel 61 (see FIG. 4). When a drive gear 60 that engages the gear section 61a is rotated, the cam barrel 61 is rotated. At this time, the cam barrel 61 slides along the optical axis A by cam actions between the cam grooves 62a of the fixed barrel 62 and the cam pins of the cam barrel 61. A first and second cam grooves (not shown) are formed on the inner periphery of the cam barrel 61.

The rectilinear guide barrel 63 is arranged inside the cam barrel 61, and is rotatable together with the cam barrel 61 and is movable in the direction of the optical-axis A. The first barrel 11 of the first lens unit 10 is arranged between the cam barrel 61 and the rectilinear guide barrel 63, and a cam pin mounted on an outer periphery of the first barrel 11 of the first lens unit 10 is engaged with the first cam groove of the cam barrel 61. A rectilinear groove (not shown) is formed on the outer periphery of the rectilinear guide barrel 63 in the direction of the optical axis A, and an engagement of a convex part formed on the inner periphery of the first barrel 11 to the rectilinear groove regulates a rotation of the first barrel 11.

The second lens unit 20 is arranged inside the rectilinear guide barrel 63. A cam pin (not shown) mounted on the second barrel 21 of the second lens unit 20 is engaged with the second cam groove of the cam barrel 61 as in the case of the first lens unit 10. A penetrating groove (not shown) is formed on the rectilinear guide barrel 63 in the direction of the optical axis A. An engagement of an engagement part formed at the bottom of the cam pin of the second barrel 21 to this penetrating groove regulates a rotation of the second barrel 21.

Then, when the cam barrel 61 rotates, the cam action between the first cam groove of the cam barrel 61 and the cam pin of the first barrel 11 slides the first barrel 11 with respect to the cam barrel 61 in the direction of the optical axis A while sliding the convex part of the first barrel 11 along the rectilinear groove of the rectilinear guide barrel 63 in the direction of the optical axis A. Therefore, when the cam barrel 61 slides with respect to the fixed barrel 62 along the optical axis A, the first barrel 11 slides with respect to the cam barrel 61 along the optical axis A, which moves the first lens group 1 within a range between a retracted position and a taking position. The similar action moves the second lens group 2 within a range between the retracted position and the taking position.

Figure 4:
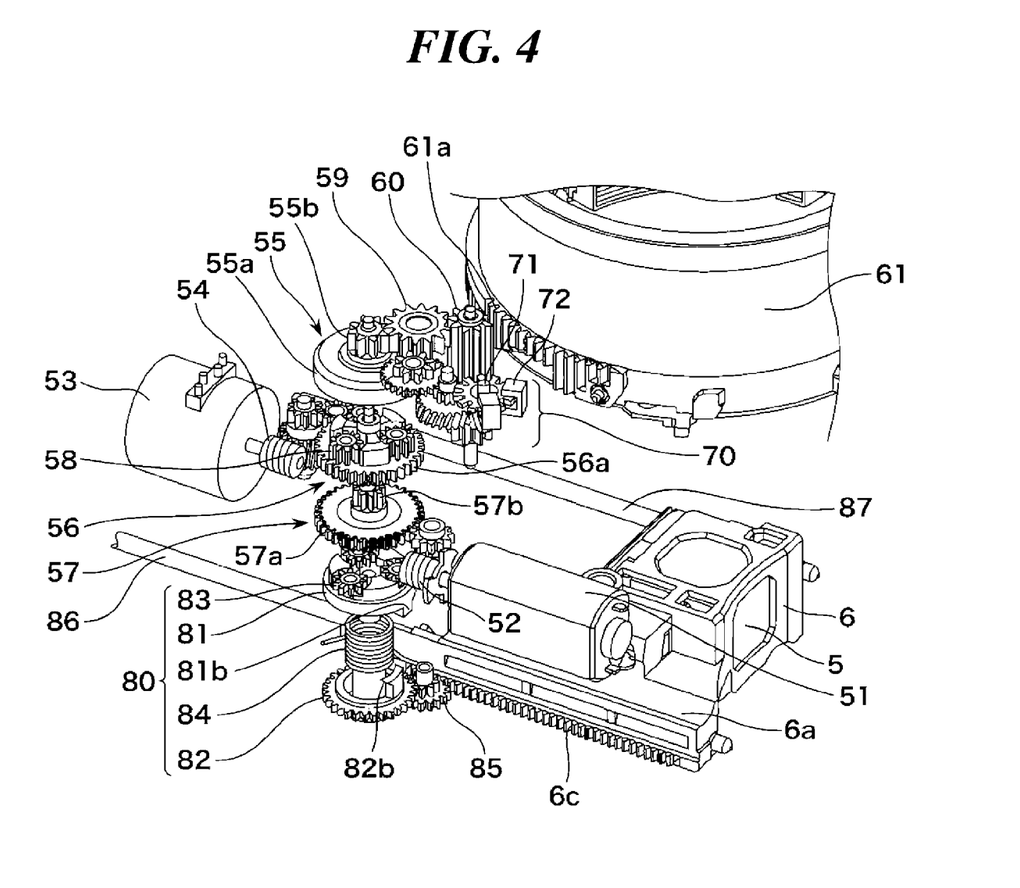
FIG. 4 is a partially exploded perspective view showing a mechanism that drives a cam barrel and a prism in the lens barrel shown in FIG. 1.

Next, a transmission mechanism that transmits a driving force of a motor to the cam barrel 61, and a transmission mechanism that transmits a driving force of a motor to the prism 5 will be described with reference to FIG. 4 through FIG. 8. FIG. 4 is a partially exploded perspective view of a mechanism that drives the cam barrel 61 and the prism 5.

Figure 8:
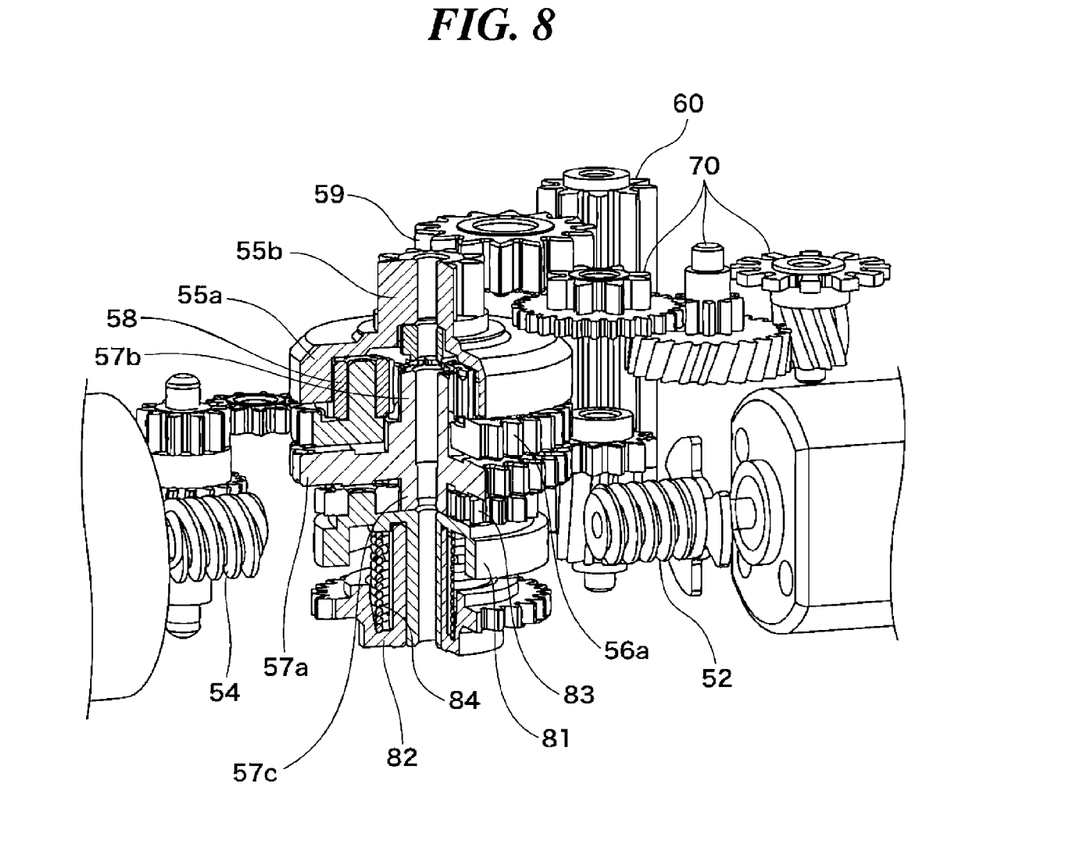
FIG. 8 is a sectional view showing a part of a mechanism that drives the cam barrel and the prism shown in FIG. 4.

In FIG. 4 and FIG. 8, an SW motor 51 is a driving source for moving the first lens unit 10 and the second lens unit 20 within a range between the SINK position and the WIDE position. A TW motor 53 is a driving source for moving the first lens unit 10 and the second lens unit 20 within a range between the TELE position and the WIDE position. The SW motor 51 and the TW motor 53 are arranged so that motor shafts are parallel to the optical axis B and output sides are directed inside. The TW motor 53 is arranged at the subject side than the SW motor 51. A worm gear 52 is press-fitted to the motor shaft of the SW motor 51, and a worm gear 54 is press-fitted to the motor shaft of the TW motor 53.

A zoom ring gear 55, a zoom carrier gear 56, and a sun gear train 57 are aligned on the same shaft, which is parallel to the optical axis A, in this order from the subject side (an upper side in FIG. 4 and FIG. 8) between the worm gear 52 and the worm gear 54.

As shown in FIG. 8, the sun gear train 57 is provided with sun gears 57a, 57b, and 57c that consist of three-step spur gears. The sun gear 57a meshes with the worm gear 52 via a helical gear.

The zoom carrier gear 56 is provided with a gear part 56a and three shafts that are protruded on the subject side of the gear part 56a at nearly regular intervals in the circumferential direction. Zoom planet gears 58 are supported rotatably by the three shafts, respectively. The gear section 56a meshes with the worm gear 54 via a helical gear etc., and the zoom planet gears 58 meshes with the sun gear 57b.

The zoom ring gear 55 is provided with an internal gear 55a and an external gear 55b. The internal gear 55a meshes with the zoom planet gears 58, the external gear 55b meshes with a drive gear 60 via an idler gear 59, and the drive gear 60 meshes with the gear section 61a of the cam barrel 61. Here, the gear train that is arranged among the TW motor 53, the SW motor 51, and the gear section 61a constitutes a first transmission mechanism that transmits a driving force of a motor to the cam barrel 61.

Next, the prism driver 80 will be described. The prism driver 80 is provided with a prism carrier 81, a torsion spring 84, and a prism delay gear 82 that are aligned on the same shaft as the sun gear train 57 in this order from the subject side below the sun gear train 57. The prism delay gear 82 is supported rotatably by the prism carrier 81.

Three shafts are protruded on the subject side of the prism carrier 81 at nearly regular intervals in the circumferential direction. Prism planet gears 83 are supported rotatably by the three shafts, respectively. The prism planet gears 83 meshes with an internal gear fixed to the gear base plate (not shown) of the sun gear 57c.

A gear section of the prism delay gear 82 meshes with the prism drive gear 85. A lock part 81b and a lock part 82b are formed on the prism carrier 81 and the prism delay gear 82, respectively, so that they are extended to face each other. The lock part 81b is arranged at an inner side than the lock part 82b in the radial direction (see FIG. 7A).

The torsion spring 84 is provided with a coil body, and two arms 84a and 84b prolonged in the radial direction from both edges of the coil body in the axial direction. The two arms 84a and 84b are hung on the lock part 82b of the prism delay gear 82 and the lock part 81b of the prism carrier 81. When the torsion spring 84 is assembled, the lock part 82b and the lock part 81b are positioned at the same phase (see FIG. 7B), the two arms 84a and 84b are hung on the lock parts 82b and 81b to precharge the torsion spring 84. Rotation of the prism carrier 81 is transmitted to the prism delay gear 82 via the torsion spring 84.

When rotation of the prism delay gear 82 is set free and the prism carrier 81 is rotated in this condition, the prism carrier 81, the prism delay gear 82, and the torsion spring 84 rotate as one. On the other hand, when the rotation of the prism delay gear 82 is regulated and the prism carrier 81 is rotated, only the prism carrier 81 rotates while overcharging the torsion spring 84.

Figure 5:
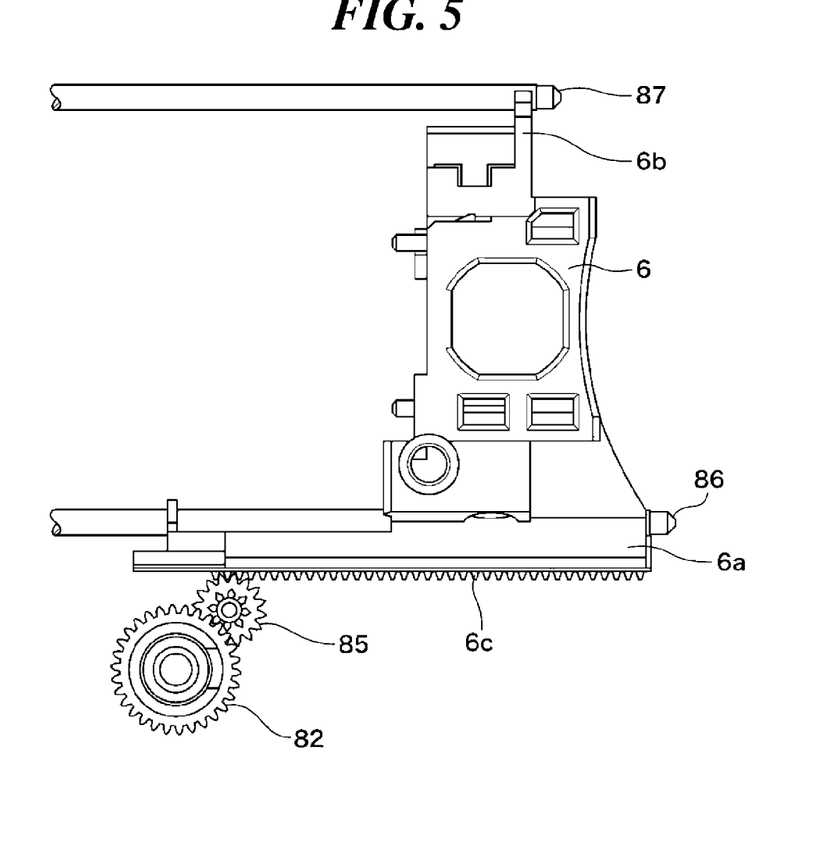
FIG. 5 is a plan view showing a part of a holding member that holds the prism and a prism driver in the lens barrel shown in FIG. 1.

FIG. 5 is a plan view showing a part of the holding member 6 that holds the prism 5 and a prism driver 80 in the lens barrel in FIG. 1.

As shown in FIG. 5, the holding member 6 is provided with engagement parts 6a and 6b that movably engage with two guide shafts 86 and 87 arranged in parallel to the optical axis B. A rack gear 6c is formed on the engagement part 6a, and the rack gear 6c meshes with the prism drive gear 85. Accordingly, when the prism drive gear 85 rotates, the holding member 6 slides along the optical axis B together with the prism 5.

In this embodiment, the gear train arranged between the sun gear train 57 and the rack gear 6c constitutes a second transmission mechanism that transmits a driving force of a motor to the prism 5. The second transmission mechanism is arranged within the projection area of the first transmission mechanism, which transmits the driving force of a motor to the cam barrel 61, in the direction of optical axis A. That is, the second transmission mechanism is arranged within the arrangement area of the first transmission mechanism when viewing in the direction of the optical axis A.

Next, operations of the cam barrel 61 and the prism 5 will be described with reference to FIG. 4.

When the SW motor 51 is driven and the TW motor 53 is stopped, the driving force of the SW motor 51 is transmitted to the sun gear train 57 and rotates the sun gear train 57, while the zoom carrier gear 56 connected to the TW motor 53 stops. Therefore, the zoom planet gears 58 do not revolve but rotate on their axes.

For example, assuming that the number of teeth of the sun gear 57b is "9", the number of teeth of the zoom planet gear 58 is "10", and the number of teeth of the internal gear 55a of the zoom ring gear 55 is "30", the rotation of the sun gear train 57 is reduced by 1/3.33 and is transmitted to the zoom ring gear 55. Accordingly, the rotation of the external gear 55b is transmitted to the drive gear 60 via the idler gear 59, and the rotation of the drive gear 60 is transmitted to the gear section 61a of the cam barrel 61 and rotates the cam barrel 61.

The direction of rotation of the zoom ring gear 55 is reverse to that of the sun gear train 57. Then, the rotation of the sun gear train 57 is transmitted to the prism carrier 81 through the prism planet gears 83. If the holding member 6 is movable in the direction of the optical axis B, the torsion spring 84 and the prism delay gear 82 rotate together with the prism carrier 81, which slides the holding member 6 in the direction of the optical axis B. On the other hand, if movement of the holding member 6 in the direction of the optical axis B is regulated, since the prism delay gear 82 cannot rotate, the torsion spring 84 absorbs the rotation of the prism carrier 81 while overcharging.

When the SW motor 51 is stopped and the TW motor 53 is driven, the sun gear train 57 connected to the SW motor 51 stops, while the zoom carrier gear 56 connected to the TW motor 53 rotates. Therefore, the zoom planet gears 58 revolve and rotate on their axes. For example, assuming that the number of teeth of the sun gear 57b is "9", the number of teeth of the zoom planet gear 58 is "10", and the number of teeth of the internal gear 55a of the zoom ring gear 55 is "30", the rotation of the zoom carrier gear 56 is accelerated by 1.3 times and is transmitted to the zoom ring gear 55. This rotates the cam barrel 61 in the same manner as described above.

In this case, the direction of rotation of the zoom ring gear 55 becomes identical to that of the zoom carrier gear 56. Then, since the sun gear train 57 stops at this time, the prism carrier 81 is also stopped and the driving force is not transmitted to the holding member 6.

When the SW motor 51 and the TW motor 53 are driven simultaneously, the composed rotation speed is transmitted to the zoom ring gear 55. For example, the case where the sun gear train 57 rotates at 1 rpm in the CW (clockwise) direction and the zoom carrier gear 56 rotates at 1 rpm in the CW direction will be considered. The rotation speed of the zoom ring gear 55 that should be transmitted by the sun gear train 57 is 0.3 rpm in the CCW (counter clockwise) direction, and the rotation speed of the zoom ring gear 55 that should be transmitted by the zoom carrier gear 56 is 1.3 rpm in the CW direction. Therefore, the zoom ring gear 55 rotates at 1 rpm in the CW direction by composing these driving forces.

Here, the case where the sun gear train 57 rotates at 1.3 rpm in the CW direction and the zoom carrier gear 56 rotates at 0.3 rpm in the CW direction will be considered. The rotation speed of the zoom ring gear 55 that should be transmitted by the sun gear train 57 is 0.39 rpm in the CCW direction, and the rotation speed of the zoom ring gear 55 that should be transmitted by the zoom carrier gear 56 is 0.39 rpm in the CW direction. When these are composed, the zoom ring gear 55 stops.

As described above, when the rotation speeds and the rotation directions of the SW motor 51 and the TW motor 53 are selected suitably, the prism 5 is driven while stopping the cam barrel 61. The reduction gear ratio of the gear train linked to the SW motor 51 becomes large, and the reduction gear ratio of the gear train linked to the TW motor 53 becomes small. This point will be described below.

Next, an operation to extend the first lens unit 10 and the second lens unit 20 in the direction of the optical axis A, and to arrange the prism 5 at the taking position will be described with reference to FIG. 6 and FIG. 7.

FIG. 6 is a development view showing the inner surface of the fixed barrel 62. As shown in FIG. 6, the cam grooves 62a to which the cam pins mounted on the outer periphery of the cam barrel 61 are engaged are formed on an inner surface of the fixed barrel 62 at nearly regular intervals in a circumferential direction. A cutout portion 62b through which the holding member 6 holding the prism 5 passes when sliding in the direction of the optical axis B is formed on the rear end part of the fixed barrel 62.

Figure 7A:
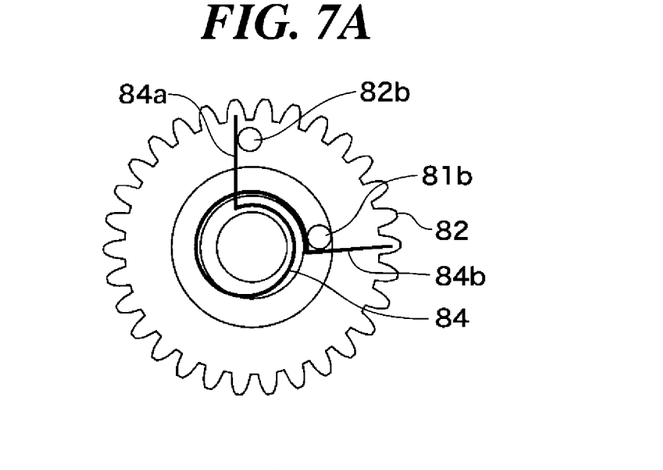
FIG. 7A, FIG. 7B, and FIG. 7C are views showing phase relations between a prism carrier and a prism delay gear, and charge amounts of a torsion spring.
Figure 7B:
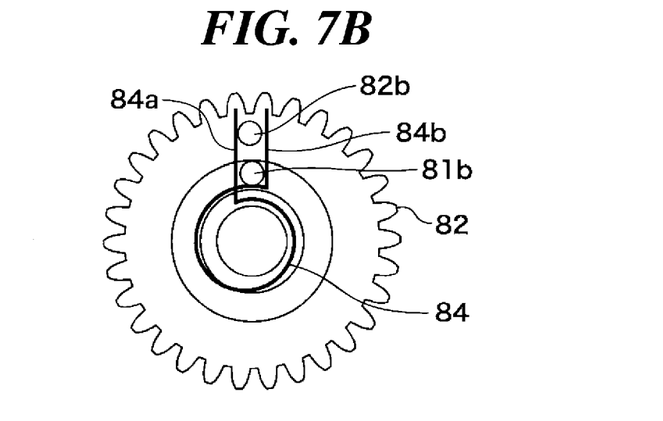
Figure 7C:
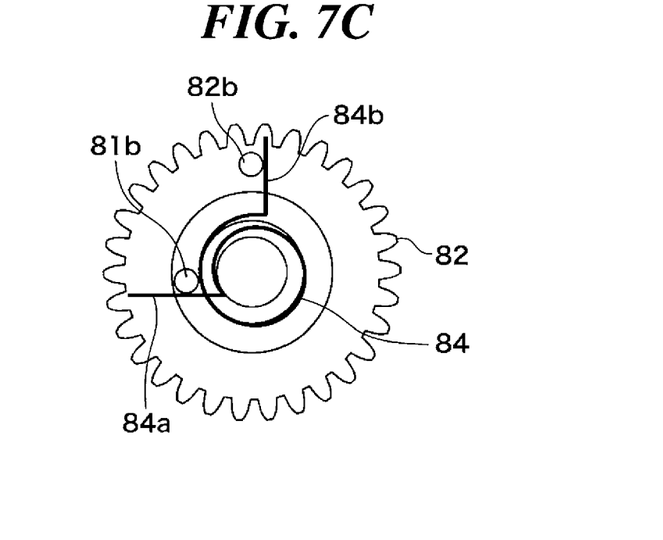

FIG. 7A, FIG. 7B, and FIG. 7C are views showing phase relations between the prism carrier 81 and the prism delay gear 82, and charge amounts of the torsion spring 84.

When the lens barrel is in the SINK position, the cam pin of the cam barrel 61 is arranged at a position 62c shown in FIG. 6 in the cam groove 62a of the fixed barrel 62. At this time, the prism carrier 81 and the prism delay gear 82 have the phase relation to overcharge the torsion spring 84 as shown in FIG. 7A. Although the holding member 6 is pushed by the charge power of the torsion spring 84 in an escape direction (a direction toward the side of the image pickup device 8) along the optical axis B in this condition, movement in the escape direction is regulated by a mechanical edge (not shown).

In order to bring the lens barrel into a taking condition, the SW motor 51 is rotated in the extending direction of the cam barrel 61 first. At this time, the cam pin of the cam barrel 61 moves rightward in FIG. 6 along the cam groove 62a of the fixed barrel 62. The first lens unit 10 and the second lens unit 20 move in the extending direction along the optical axis A when the cam pin enters into a lifting section of the cam groove 62a. During this extending operation, although the prism carrier 81 also rotates in a direction to extend the holding member 6 to the taking position, since the torsion spring 84 is in the overcharged condition, the prism delay gear 82 remains stopped. Therefore, the holding member 6 does not move from an escape position.

When the cam barrel 61 extends in the direction of optical axis A to keep a space into which the holding member 6 can move to the taking position, the phases of the lock part 81b of the prism carrier 81 and the lock part 82b of the prism delay gear 82 are in agreement as shown in FIG. 7B.

When the SW motor 51 is rotated in the extending direction of the cam barrel 61, the cam pin of the cam barrel 61 moves rightward in FIG. 6 along the cam groove 62a of the fixed barrel 62, and the holding member 6 moves towards the taking position simultaneously.

Then, when the cam barrel 61 reaches the WIDE position, the TW motor 53 is rotated in the retracting direction of the cam barrel 61 while driving the SW motor 51 in the extending direction of the cam barrel 61. Accordingly, only the holding member 6 continues moving towards the taking position along the optical axis B, while the cam barrel 61 is stopped at the WIDE position.

When reaching the taking position, the holding member 6 stops in contact with a taking side stopper (not shown). Simultaneously with a stop of the holding member 6, the prism delay gear 82 also stops. When the SW motor 51 is further driven in the extending direction of the cam barrel 61 at this time, the prism carrier 81 continues rotating in the direction to extend the holding member 6 to the taking position, which overcharges the torsion spring 84. When the torsion spring 84 is overcharged to some extent, the torsion spring 84 pushes the holding member 6 to the taking side stopper, which is effective to stabilize the position and orientation of the holding member 6 at the time of taking.

When the torsion spring 84 reaches a predetermined overcharged condition, the SW motor 51 and the TW motor 53 are stopped.

The above described operation arranges the first lens unit 10, the second lens unit 20, and the prism 5 at the WIDE position, and the image pickup apparatus moves to the taking condition. When the cam barrel 61 reaches the WIDE position, the cam pin moves to a position 62d in the cam groove 62a of the fixed barrel 62. Then, the third lens unit 30 and the fourth lens unit 40 are moved to the predetermined positions in the optical axis B by driving a motor (not shown).

An operation in reverse order to the above-mentioned operation moves the lens barrel to the SINK position from the WIDE position. First, the motor (not shown) is driven so that the third lens unit 30 and the fourth lens unit 40 escape to the side of the image pickup device 8 along the optical axis B. Next, when the TW motor 53 is driven in the extending direction of the cam barrel 61 and the SW motor 51 is simultaneously driven in the retracting direction of the cam barrel 61, only the prism carrier 81 rotates in the direction to retract the holding member 6 to the escape position without rotating the cam barrel 61.

Then, the prism carrier 81 rotates by the overcharged energy of the torsion spring 84 mentioned above, and the phases of the lock part 81b of the prism carrier 81 and the lock part of the prism delay gear 82 are in agreement. At this time, the prism delay gear 82 rotates together with the prism carrier 81 and the torsion spring 84 in the direction to retract the holding member 6 to the escape position, and the holding member 6 moves in the escape direction.

When the holding member 6 moves to the escape position and the storage space is formed behind the cam barrel 61, the TW motor 53 stops and only the SW motor 51 continues rotating in the direction to retract the cam barrel 61, which starts to retract the cam barrel 61. When moving to the escape position, the holding member 6 contacts the mechanical edge (not shown) of the escape side and stops. At the same time, the prism delay gear 82 also stops.

Since the SW motor 51 continues rotating in order to retract the cam barrel 61 to the retracted position, the prism carrier 81 continues rotating in the direction to retract the holding member 6 to the escape position while overcharging the torsion spring 84. When the cam barrel 61 is stored in the SINK position and the first lens unit 10 and the second lens unit 20 are retracted, the SW motor 51 stops.

A zooming operation of the lens barrel between the WIDE position and the TELE position requires driving the TW motor 53 only. This moves the first lens unit 10 and the second lens unit 20 in the direction of the optical axis A without moving the holding member 6 in the direction of the optical axis B. At the TELE position of the lens barrel, the cam pin of the cam barrel 61 is arranged at a position 62e in the cam groove 62a of the fixed barrel 62 (see FIG. 6).

Next, an effect of the condition where the reduction gear ratio of the gear train linked to the SW motor 51 is larger than that of the gear train linked to the TW motor 53 will be described.

Usually, a driving load of the cam barrel 61 when the cam pin moves in the cam groove 62a of the fixed barrel 62 within a range of large lift angle from the SINK position to the WIDE position is larger than that within a range from the WIDE position to the TELE position. Since an operation load of a lens barrier (not shown) is usually added within the range from the SINK position to the WIDE position, the gear train of large reduction gear ratio is needed to amplify the torque of the motor.

On the other hand, the rotation speed of the motor should be lowered within the range from the WIDE position to the TELE position in order not to record motor driving noise while taking a movie etc. At this time, a use of the gear train with large reduction gear ratio extremely slows the rotation speed of the cam barrel.

In this embodiment, the driving force of the SW motor 51 is transmitted to the cam barrel 61 via the gear train with the large reduction gear ratio within the range of the large load on the cam barrel 61 from the SINK position to the WIDE position in order to drive the cam barrel 61. On the other hand, the driving force of the TW motor 53 is transmitted to the cam barrel 61 via the gear train with the small reduction gear ratio within the range from the WIDE position to the TELE position in order to drive the cam barrel 61. Therefore, even if the TW motor 53 rotates at the low rotation speed to decrease the motor driving noise while taking a movie, a comfortable zooming operation speed is obtained.

In this embodiment, the motors of different types can be used for the SW motor 51 and the TW motor 53. For example, a DC motor is used for the SW motor 51, and a stepping motor is used for the TW motor 53. Since a stepping motor can be stably controlled in a low speed as compared with a DC motor, it is suitable for the low speed driving while taking a movie.

A stepping motor offers driving methods such as a microstep drive and a two-phase excitation drive as options. Since the microstep drive provides a more silent drive and the two-phase excitation drive provides a high torque drive, the microstep drive is preferably used for an operation that needs silence like the zooming operation while taking a movie, and the two-phase excitation drive is preferably used for the zooming operation while taking a still image, for example.

Next, a pulse gear train 70 for detecting the positions of the first lens unit 10 and the second lens unit 20 in the direction of the optical axis A will be described.

As shown in FIG. 4 and FIG. 8, the pulse gear train 70 is connected to the idler gear 59. A pulse disk 71 that is the final stage of the pulse gear train 70 is provided with a plurality of blades. The rotation amount of the cam barrel 61 is detected by counting the number of times the blades pass through a clearance of a photointerrupter 72. A speed increasing ratio of the pulse gear train 70 and the number of the blades of the pulse disk 71 are determined so as to obtain a required resolution decided by an optical design.

Since a gear train used for transferring a driving force of a motor has fundamentally no loss in the rotation amount due to a slip, the rotation amount of the cam barrel is linearly determined by the rotation amount of the motor using the reduction gear ratio. However, the rotation amount of the cam barrel determined by the rotation amount of the motor varies according to a backlash or an engagement error of the gear train in fact.

Since the conventional lens barrel drives one cam barrel by one motor, an engagement relation among gears does not vary even if the motor is driven after assembling the gear train once. That is, since the same teeth mesh each time, the varying condition of the rotation amount of the cam barrel with respect to the rotation amount of the motor is identical each time. Therefore, even if the rotation amount of the cam barrel is calculated based on the rotation amount of the motor, the error of the calculated result with respect to an actual rotation amount is small.

On the other hand, since this embodiment drives one cam barrel by composing the rotation amounts of two motors using the planet gear train, a rotation of one motor changes the relation of the meshing teeth between the other motor and the zoom ring gear 55.

That is, since different teeth mesh whenever power of a camera turns on, the varying condition of the rotation amount of the cam barrel with respect to the rotation amount of the motor is different each time. Therefore, even if the rotation amount of the cam barrel is calculated based on the rotation amount of the motor, the error of the calculated result with respect to an actual rotation amount may become large.

In this embodiment, since the pulse gear train 70 branches from the idler gear 59 arranged between the zoom ring gear 55, which is an output gear of the planet gear train, and the cam barrel 61, the engagement relation between the pulse gear train 70 and the cam barrel 61 is invariant. Therefore, the rotation amount of the cam barrel is detectable with an error equivalent to the conventional lens barrel.

As described above, this embodiment arranges the transmission mechanism that transmits the driving force of the motor to the prism 5 within the projection area of the transmission mechanism that transmits the driving force of the motor to the cam barrel 61 in the direction of optical axis A.

Accordingly, since the area that is occupied by the transmission mechanisms that transmit the driving force of the motor to the cam barrel 61 and the prism 5 when viewing in the direction of the optical axial A can be decreased, the image pickup apparatus such as a digital camera can be miniaturized.

Since the cam barrel 61 and the prism 5 are driven by the common motors, the size and cost of the image pickup apparatus such as a digital camera can be reduced as compared with a case where an exclusive motor is mounted to drive the prism 5.

It should be noted that the configuration of the present invention is not limited to what has been described with the above-mentioned embodiment, a material property, a shape, a size, a form, a number, an arrangement position, etc. can be changed suitably unless it is deviated from the scope of the present invention.

For example, although the above-mentioned shows the prism 5 as the bending optical element, a mirror may be used instead. Although the embodiment shows the case where the bending optical element is arranged behind the second lens unit 20, it may be arranged between the first lens unit 10 and the second lens unit 20, for example.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-124471, filed on May 31, 2010, which is hereby incorporated by reference herein in its entirety.

What is claimed is:

1. A lens barrel comprising:
a lens group that is movable along a first optical axis;
a cam barrel that moves said lens group;
a first transmission mechanism that transmits a driving force of a driving source to the said cam barrel;
a bending optical element that is movable along a second optical axis that intersects the first optical axis;
an element driver that moves said bending optical element to a position where said bending optical element bends a light flux entered through said lens group in the direction of the second optical axis when said lens group and said cam barrel move in an extending direction along the first optical axis, and that moves said bending optical element to an escape position along the second optical axis to form a storage space for said cam barrel when said lens group and said cam barrel move in a retracting direction along the first optical axis; and
a second transmission mechanism that transmits a driving force of a driving source to said element driver,
wherein said second transmission mechanism is arranged within an arrangement area of said first transmission mechanism when viewing in the direction of the first optical axis.

2. The lens barrel according to claim 1, wherein said first transmission mechanism and said second transmission mechanism are connected to the same driving source.

3. The lens barrel according to claim 1, wherein a part of said second transmission mechanism is arranged to be coaxial to a part of said first transmission mechanism.

* * * * *